April 25, 1967   L. JAEGERS   3,315,554
SAWING APPARATUS

Filed Feb. 12, 1965   4 Sheets-Sheet 4

Inventor:

United States Patent Office

3,315,554
Patented Apr. 25, 1967

3,315,554
SAWING APPARATUS
Leopold Jaegers, Munstereifeler Str. 115,
Euskirchen, Germany
Filed Feb. 12, 1965, Ser. No. 432,094
15 Claims. (Cl. 83—588)

The present invention relates to a sawing apparatus, and especially to a sawing apparatus for sawing metal in cold condition. Apparatus of this kind usually include a circular saw blade extending with a portion thereof through a slot of a support plate against which a workpiece that is to be sawed by the apparatus is adapted to abut and to be advanced against a saw blade rotating about a fixed axis. Sawing apparatus are also known in which the workpiece is held stationary on the support plate and in which the rotating saw blade is advanced in a direction transverse to its axis through the workpiece. In apparatus of the latter kind the saw blade, or the gear box which supports the saw blade, is provided with rollers which are arranged between guideways on the machine frame. This arrangement, however, has the disadvantage, that the pressure which the teeth of the circular saw blade impart onto the workpiece during the sawing reacts on the saw blade tending to lift the latter in a direction normal to the plane of the plate on which the workpiece is supported so as to lift the rollers of the means supporting the saw blade off from the supporting guideways. Since the aforementioned pressure will vary during the sawing operation, depending upon the engagement of the teeth with the workpiece and depending upon the varying resistance of the workpiece, the saw blade will tend to vibrate in an undesirable manner in the direction of its plane which will detrimentally affect the sawing operation and which will detrimentally increase the wear of the blade.

It is an object of the present invention to provide for a sawing apparatus in which the circular saw blade moves relative to a stationary workpiece during the sawing operation, and in which oscillation of the saw blade during the sawing operation is prevented.

It is an additional object of the present invention to provide for a sawing apparatus of the aforementioned kind in which the saw blade is perfectly guided during its movement through the workpiece to be sawed.

It is a further object of the present invention to provide for a sawing apparatus of the aforementioned kind which is constructed of a few and relatively simple parts so that the sawing apparatus can be produced at reasonable cost and will stand up perfectly under extended use.

With these objects in view, the sawing apparatus of the present invention mainly comprises support means including an elongated support plate having a plane face against which a workpiece to be sawed is adapted to abut and a face opposite said plane face. The support plate is preferably formed with a longitudinal slot extending therethrough and a pair of guide means is provided fixed to the opposite face extending in longitudinal direction of the support plate and facing away from the plane face thereof substantially parallel thereto. The apparatus includes further a rotary saw blade extending with an upper portion thereof through the aforementioned slot, and supporting means supporting the saw blade turnable about its axis and movable in the longitudinal direction of the slot. This supporting means has a pair of guide portions respectively engaging the aforementioned guide means and the supporting means includes further biasing means for constantly biasing the guide portions into engagement with the guide means.

Means are also provided operatively connected to the saw blade for rotating the same about its axis, and reciprocating means are operatively connected to the means for supporting the saw blade for reciprocating the supporting means and the saw blade carried thereby in longitudinal direction of the slot.

In this construction, the biasing means constantly press the guide portions of the means for supporting the rotary saw blade into engagement with the guide means, and since the reaction of the pressure between the teeth of the circular saw blade and the workpiece will act in the same direction as the biasing means, the guide portions of the means for supporting the saw blade will remain in constant and positive engagement with the guide means so that vibration of the saw blade in the direction of its plane will be positively avoided.

The biasing means are preferably in the form of resilient means for resiliently biasing the guide portions on the means for supporting the saw blade into engagement with the guide means.

The saw blade may be supported by a gear box which at one end thereof is provided with guide portions engaging the aforementioned guide means, and the sawing apparatus may also include real means extending spaced from and substantially parallel to the pair of guide means and roller means rollingly engaging the rail means. In this construction the resilient means are operatively connected to the roller means and the gear box for resiliently pressing the guide portions of the gear box against the guide means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
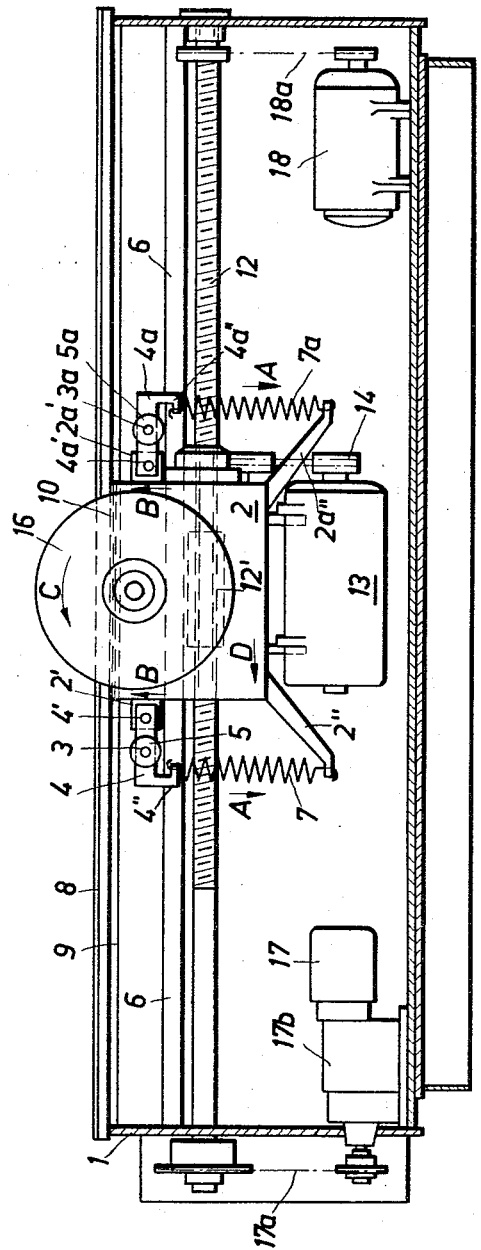
FIG. 1 is a longitudinal section of a sawing apparatus according to the present invention.
Figure 2:
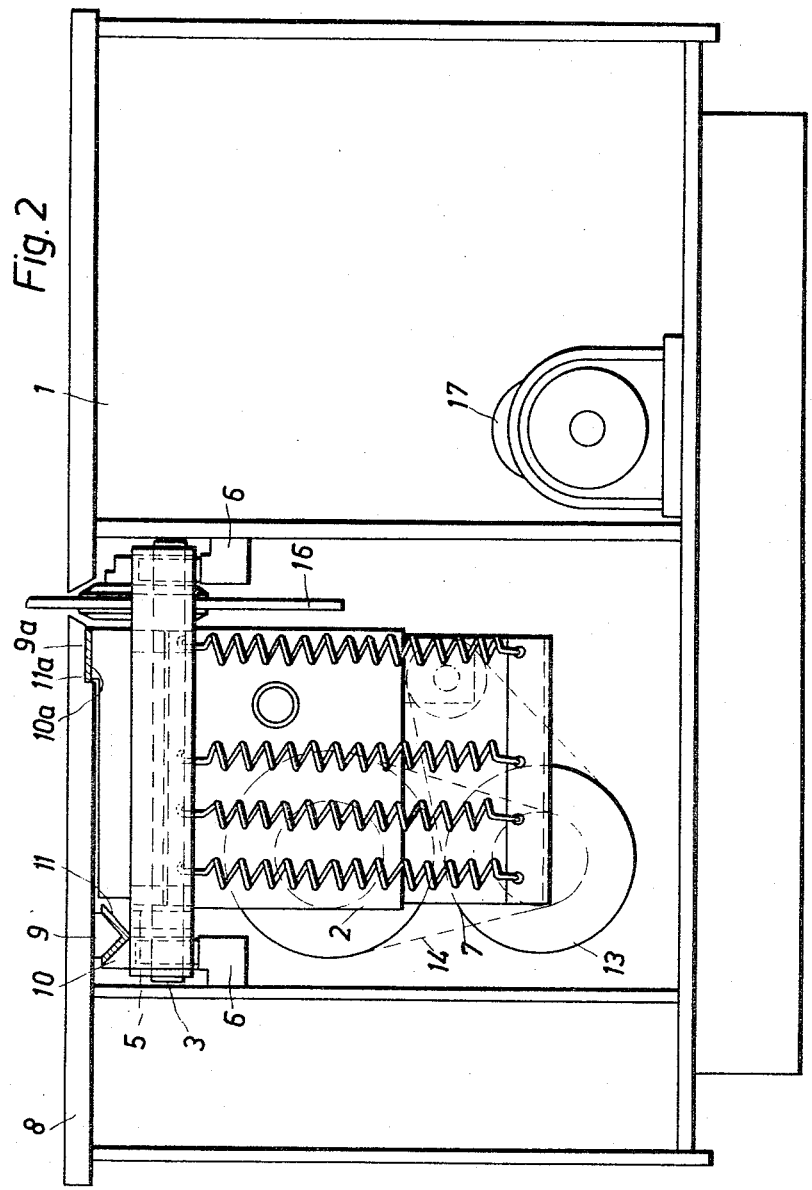
FIG. 2 is a front view of the sawing apparatus shown in FIG. 1 with the front wall of the supporting frame removed.
Figure 3:
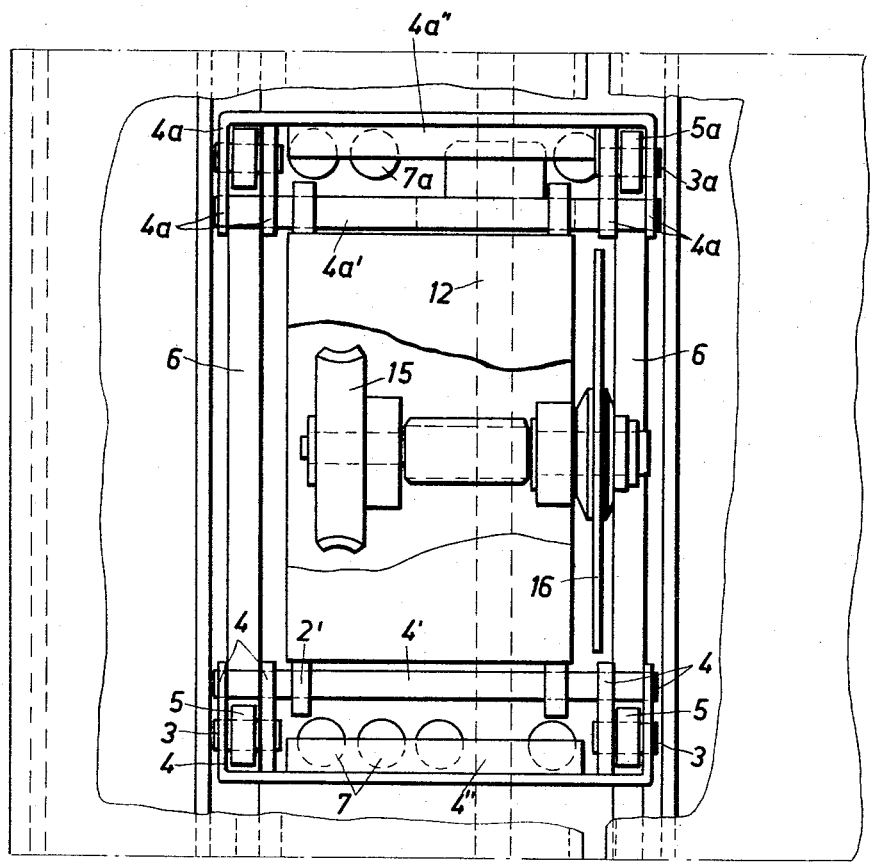
FIG. 3 is a partial plan view of the apparatus shown in FIG. 1 with parts thereof partly removed.

Referring now to the drawings, and specifically to FIGS. 1–3 of the same, it will be seen that the sawing apparatus according to the present invention illustrated in these figures, includes an elongated frame 1, supporting on upper portions thereof an elongated substantially horizontal support plate 8 having an upper plane horizontal face against which a workpiece to be sawed is adapted to abut and a bottom face opposite the aforementioned plane face. The support plate is formed with a longitudinally extending slot 8' therethrough. A pair of guide means 9 and 9a are fixed to the bottom face of the plate 8 and the pair of guide means extends in the longitudinal direction of the plate 8 facing away from the upper plane face thereof and being parallel thereto. The guide means 9 has a cross section of substantially triangular configuration, as shown in FIG. 2, whereas the guide means 9a is substantially flat. The faces of the guide means 9 and 9a facing away from the upper surface of the plate 8 may be provided with a coating of hard material 11, 11a, respectively. The guide means 9, 9a and the upper surface of the supporting plate 8 are machined so as to extend exactly parallel to each other. Fixedly connected to the frame 1 are further a pair of rails, or rail means 6 which extend spaced from and substantially parallel to the pair of guide means 9 and 9a. A circular saw blade 16 extends with an upper portion thereof through the slot 8' in the support plate 8. The circular saw blade 16 is mounted on a shaft which in turn is rotatably supported in appropriate bearings in a gear box 2. Keyed to the shaft of the saw blade 16 is a worm gear 15 (FIG. 3) which meshes with a worm, not shown in the drawings, and which in turn is driven over a pulley and belt drive 14 from a motor 13 which is carried on a lower portion of the gear box 2 so that the saw blade 16 may be rotated in the direction as indicated by the arrow C. The motor 13 is preferably mounted on one end of an arm which in turn is pivotally connected at the other end thereof to the gear box in such a manner that the weight of the motor 13 will tension the belt drive 14. The gear box 2 preferably includes an oil bath so that the various gear which are located in the gear box, are properly lubricated. A pair of lugs 2' and 2a' respectively project from opposite side walls of the gear box and a pair of arm means 4 and 4a are respectively pivotally connected at the ends thereof facing the gear box to the lugs 2' and 2a', respectively, by means of pivot pins 4' and 4a', respectively mounted in the lugs 2' and 2a' and extending in a plane parallel to the upper surface of the plate 8 and in the plane substantially normal to the aforementioned guide means 9 and 9a. Two pairs of rollers 3 and 3a are respectively turnably mounted on the arm means 4 and 4a intermediate the ends of the latter and the rollers 3 and 3a rollingly engage the rails 6. A plurality of coiled tension springs 7 and 7a are respectively connected at the upper ends thereof to the outer ends 4" and 4a" of the arms 4 and 4a, respectively, and the tension springs 7 and 7a are respectively connected at the lower ends thereof to fixed arms 2" and 2a" respectively projecting from the bottom wall of the gear box 2 to opposite sides of the latter. The coiled tension springs 7 and 7a will tend to pull the outer ends 4" and 4a" of the arms 4 and 4a downwardly, thereby tending to pivot the arms 4 and 4a about the axes of the rollers 3 and 3a in such a manner so as to move the inner ends 4' and 4a' of the arms and thereby the gear box 2 connected thereto in upward direction, as indicated by the arrow B, to resiliently press thereby the guide portions 10 and 10a at the upper end of the gear box against the guide faces 11 and 11a of the guide means 9 and 9a. The guide portions 10 and 10a of the gear box will thereby be positively held in engagement with the guide faces of the guide means 9 and 9a regardless of any irregularities in the guide rails 6 and regardless of any clearance in the bearings mounting the rollers 3 and 3a on the arms 4 and 4a. This will positively prevent any oscillation of the saw blade 16 in a direction normal to the upper face of the support plate 8 which will improve the sawing operation and which reduce the wear of the saw blade.

The sawing apparatus according to the present invention includes further reciprocating mean operatively connected to the gear box for reciprocating the latter and the saw blade carried thereby in longitudinal direction of the slot 8'. The reciprocating means of the embodiment of the sawing apparatus illustrated in FIGS. 1–3 includes an elongated screw spindle 12 mounted on opposite ends thereof turnably in the frame of the apparatus, while being prevented to shift in longitudinal direction, and the screw spindle 12 extends in the direction of the guide means 9 and 9a substantially parallel thereto. A nut 12' is nonrotatable mounted in the gear box 2 and held by the latter against shifting in longitudinal direction, and the nut 12' threadedly engages the screw spindle 12 so that during turning of the latter the nut 12' and the gear box 2 connected thereto is shifted in the longitudinal direction of the screw spindle 12 in the one or the other direction depending on the sense of rotation of the screw spindle 12. An infinitely variable gear drive 17b is mounted on the frame 1 and the gear drive 17b is driven from the motor 17 connected thereto. The output shaft of the gear drive 17b carries a sprocket gear which in turn drives over a sprocket chain 17a a corresponding sprocket gear fixed to one end of the screw spindle 12. The gear drive 17b may be reversible so that the screw spindle may be rotated in one or in the opposite direction by the motor 17, or an additional motor 18 is located at the other end of the frame 1 may drive over a chain drive 18a another sprocket gear located at the opposite end of the screw spindle 12. In the latter arrangement, the motor 17 and the gear drive 17b will rotate the spindle in one direction to thereby advance the saw blade 16, in the direction indicated by the arrow D, through a workpiece held on the upper surface of the plate 8 in front of the saw blade, whereas the motor 18 will rotate the screw spindle 12 in the opposite direction to return the saw blade 16 to its starting position. It is to be understood that in the latter arrangement, in which two motors are provided which respectively rotate the spindle 12 in opposite directions, the sprocket wheels mounted on opposite ends of the screw spindle 12 are provided with a free wheeling arrangement, so that during rotation of the screw spindle 12 by the motor 17, the motor 18 and the chain drive connected thereto may remain at standstill and vice versa.

The nut 12' engages the screw spindle 12 with a certain clearance so that even if the screw spindle 12 does not extend perfectly parallel to the guide means 9 and 9a, imparting of a bending moment on the screw spindle 12 during reciprocation of the gear box 2 will be avoided.

Figure 4:
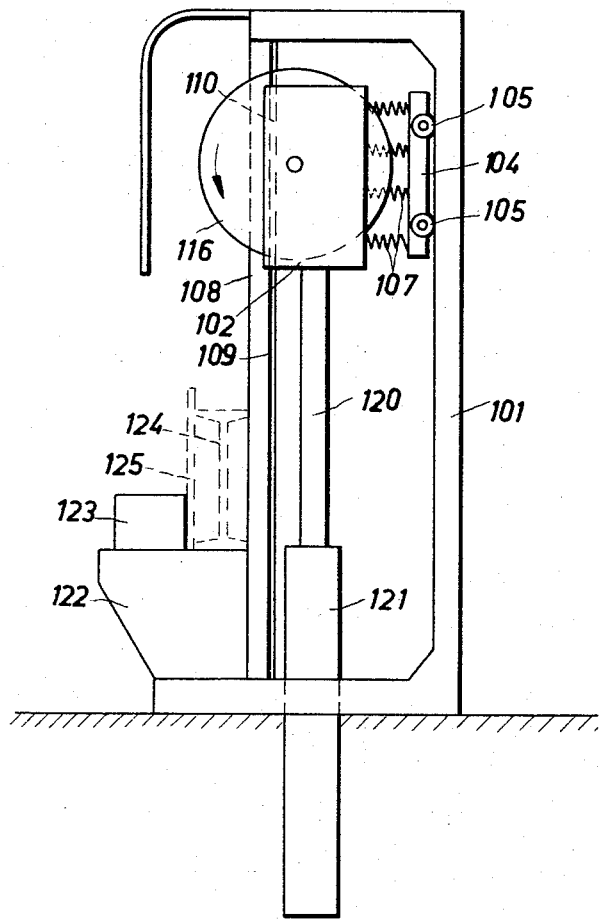
FIG. 4 is a side view of another embodiment of a sawing machine according to the present invention.

FIG. 4 illustrates another embodiment of a sawing apparatus according to the present invention. The sawing apparatus illustrated in FIG. 4 includes a substantially U-shaped frame having an upright portion 101 and an upper as well as a lower substantially horizontal portion respectively projecting from opposite ends of the upright portion. An elongated support plate 108 extends between the horizontal portions of the frame substantially parallel to the upright portion 101 spaced from the latter and the plate 108 has a plane front face facing away from the upright portion and an opposite rear face. A pair of guide means 109, only the front one is shown in FIG. 4, are fixed to the rear face of the plate 108 facing away from the front face thereof, extending in longitudinal direction of the plate parallel to the plane front face thereof. A support table 122 is mounted on the lower horizontal portion of the U-shaped frame, and a holder 123 projects upwardly from the upper surface of the table 122, so that a workpiece 124 to be sawed, may be pressed against the front face of the plate 108 by a plate 125 wedged between the holder 123 and a portion of the workpiece 124 facing away from the front face of the plate 108. The plate 108 is again provided with a slot therethrough, not shown in the drawing, extending in longitudinal direction between the upper and lower horizontal portions of the U-shaped frame, and the front portion of the circular saw blade 116 projects through the slot in the plate 108 beyond the front face of the latter. The circular saw blade 116 is turnably mounted for rotation about its axis on a gear box 102 which includes appropriate gearing, as described before in connection with FIGS. 1–3. The gear box 102 also carries a drive motor, not shown in FIG. 4, operatively connected to the gearing in the gear box 102 to rotate the circular saw blade in the direction as indicated by the arrow. The gear box 102 is provided at its side facing the plate 108 with guide portions 110 respectively engaging the guide means 109. The apparatus includes further a carriage 104 having a pair of roller means 105 guided in appropriate guides on the upright portion 101 of the U-shaped frame, so that the carriage 104 may be reciprocated in the longitudinal direction of the upright portion 101. A plurality of spring means, preferably in the form of coiled compression springs 107, is sandwiched between the surface of the carriage 104 facing the gear box 102 and the wall of the gear box facing the carriage 104, so that the gear box 102 is resiliently biased towards the left, as viewed in FIG. 4, and so that the guide portions 110 on the gear box are held in positive engagement with the guide means 109 on the rear face of the plate 108.

The reciprocating means for reciprocating the gear box 102 and the circular saw blade 116 carried thereby include, in the embodiment illustrated in FIG. 4, an elongated cylinder 121 mounted on the lower horizontal portion of the U-shaped machine frame and extending substantially parallel to the upright portion 101 of the frame. A piston, not shown in FIG. 4, is slidingly guided in the cylinder 121 and this piston is connected by a piston rod 120 to the gear box 102 so that during reciprocation of the piston in the cylinder the gear box 102 is reciprocated in the longitudinal direction of the plate 108. It is to be understood that the cylinder 121 is provided in opposite ends thereof with inlet and outlet means for alternatingly feeding a pressure fluid into the cylinder 121 to opposite sides of the piston guided therein and to discharging pressure fluid therefrom. A guard may also be provided extending from the upper horizontal portion of the U-shaped frame in front of the circular saw blade 116 when the latter is located at the upper end of the frame.

It will be understood that each of the elements described above, or two or more together, may also find a useful application in other types of sawing apparatus differing from the types described above.

While the invention has been illustrated and described as embodied in sawing apparatus having a circular saw blade mounted for reciprocation about its axis and for movement normal to its axis relative to a stationary workpiece to be sawn, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A sawing apparatus comprising, in combination, support means including an elongated support plate having a plane face against which a workpiece is to be sawn is adapted to abut and face opposite said plane face, said support plate being formed with a longitudinally extending slot therethrough; a pair of guide means fixed to said opposite face and extending in longitudinal direction of said support plate facing away from said plane face thereof and being parallel thereto; a rotary saw blade extending with a portion thereof through said slot; supporting means supporting said saw blade turnably about its axis and movable in longitudinal direction of said slot, said supporting means having guide portions engaging said guide means and said supporting means including biasing means for constantly biasing said guide portions into engagement with said guide means; drive means operatively connected to said saw blade for rotating the same about its axis; and reciprocating means operatively connected to said means for supporting the saw blade for reciprocating said supporting means and the saw blade carried thereby in longitudinal direction of said slot.

2. A sawing apparatus comprising, in combination, support means including an elongated support plate having a plane face against which a workpiece to be sawn is adapted to abut and a face opposite said plane face, said support plate being formed with a longitudinally extending slot therethrough; a pair of guide means fixed to said opposite face and extending in longitudinal direction of said support plate facing away from said plane face thereof and being parallel thereto; a rotary saw blade extending with a portion thereof through said slot; supporting means supporting said saw blade turnably about its axis and movable in longitudinal direction of said slot, said supporting means having guide portions engaging said guide means and said supporting means including resilient means for resiliently biasing said guide portions into engagement with said guide means; drive means operatively connected to said saw blade for rotating the same about its axis; and reciprocating means operatively connected to said means for supporting the saw blade for reciprocating said supporting means and the saw blade carried thereby in longitudinal direction of said slot.

3. A sawing apparatus comprising, in combination, support means including an elongated support plate having a plane face against which a workpiece to be sawn is adapt to abut and a face opposite said plane face, said support plate being formed with a longitudinally extending slot therethrough; a pair of guide means fixed to said opposite face and extending in longitudinal direction of said support plate facing away from said plane face thereof and being parallel thereto; a rotary saw blade extending with a portion thereof through said slot; rail means fixed to said support means and extending spaced from and substantially parallel to said pair of guide means; a gear box supporting said saw blade turnable about its axis and having a pair of guide portions respectively slidably engaging said pair of guide means; roller means rollingly engaging said rail means; resilient means operatively connected to said roller means and said gear box for resiliently pressing said guide portions of the latter against said guide means; drive means operatively connected to said saw blade for rotating the same about its axis; and reciprocating means operatively connected to said means for supporting the saw blade for reciprocating said supporting means and the saw blade carried thereby in longitudinal direction of said slot.

4. A sawing apparatus comprising, in combination, support means including an elongated support plate having a plane face against which a workpiece to be sawn is adapted to abut and a face opposite said plane face, said support plate being formed with a longitudinally extending slot therethrough; a pair of guide means fixed to said opposite face and extending in longitudinal direction of said support plate facing away from said plane face thereof and being parallel thereto; a rotary saw blade extending with a portion thereof through said slot; rail means fixed to said support means and extending spaced from and substantially parallel to said pair of guide means; a gear box supporting said saw blade turnable about its axis and having on one side thereof facing said guide means a pair of guide portions respectively slidably engaging said pair of guide means; roller means rollingly engaging said rail means; resilient means between said roller means and the side of said gear box opposite said one side for pressing said guide portions of said gear box against said guide means; drive means operatively connected to said saw blade for rotating the same about its axis; and reciprocating means operatively connected to said means for supporting the saw blade for reciprocating said supporting means and the saw blade carried thereby in longitudinal direction of said slot.

5. A sawing apparatus comprising, in combination, support means including an elongated support plate having a plane face against which a workpiece to be sawn is adapted to abut and a face opposite said plane face, said support plate being formed with a longitudinally extending slot therethrough; a pair of guide means fixed to said opposite face and extending in longitudinal direction of said support plate facing away from said plane face thereof and being parallel thereto; a rotary saw blade extending with a portion thereof through said slot; rail means fixed to said support means and extending spaced from and substantially parallel to said pair of guide means; a gear box supporting said saw blade turnable about its axis and having a pair of guide portions respectively slidably engaging said pair of guide means; a pair of arm means each pivotally connected to said gear box tiltable about a pivot axis located in a plane substantially parallel to said guide means and extending in said plane substantially normal to said guide means; a pair of roller means respectively turnably mounted on said pair of arm means and rollingly engaging said rail means; spring means operatively connected to said arm means for biasing the latter in a sense tending to move said pivot axis toward said guide means so as to resiliently press said guide portions of said gear box against said guide means; drive means operatively connected to said saw blade for rotating the same about its axis; and reciprocating means operatively connected to said gear box for reciprocating said gear box and the saw blade carried thereby in longitudinal direction of said slot.

6. A sawing apparatus comprising, in combination, support means including an elongated support plate having a plane face against which a workpiece to be sawn is adapted to abut and a face opposite said plane face, said support plate being formed with a longitudinally extending slot therethrough; a pair of guide means fixed to said opposite face and extending in longitudinal direction of said support plate facing away from said plane face thereof and being parallel thereto; a rotary saw blade extending with a portion thereof through said slot; rail means fixed to said support means and extending spaced from and substantially parallel to said pair of guide means; a gear box supporting said saw blade turnable about its axis and having a pair of guide portions respectively slidably engaging said pair of guide means; a pair of arm means each pivotally connected at one end thereof to said gear box tiltable about a pivot axis located in a plane substantially parallel to said guide means and extending in said plane substantially normal to said guide means, said pair of arm means respectively projecting from said connected ends thereof to opposite sides of said gear box; a pair of roller means respectively mounted on said pair of arm means intermediate the ends of the latter and rollingly engaging said rail means; spring means operatively connected to the other ends of said arm means for biasing the latter in a sense tending to move said other ends away from said guide means so as to resiliently press said guide portions of said gear box against said guide means; drive means operatively connected to said saw blade for rotating the same about its axis; and reciprocating means operatively connected to said gear box for reciprocating said gear box and the saw blade carried thereby in longitudinal direction of said slot.

7. A sawing apparatus comprising, in combination, support means including an elongated support plate having a plane face against which a workpiece to be sawn is adapted to abut and a face opposite said plane face, said support plate being formed with a longitudinally extending slot therethrough; a pair of guide means fixed to said opposite face and extending in longitudinal direction of said support plate facing away from said plane face thereof and being parallel thereto; a rotary saw blade extending with a portion thereof through said slot; rail means fixed to said support means and extending spaced from and substantially parallel to said pair of guide means; a gear box supporting said saw blade turnable about its axis and having a pair of guide portions respectively slidably engaging said pair of guide means; a pair of arm means each pivotally connected at one end thereof to said gear box tiltable about a pivot axis located in a plane substantially parallel to said guide means and extending in said plane substantially normal to said guide means, the pivot axis of one of said pair of arm means being located at one side of said gear box and the pivot axis of the other of said pair of arm means being located at the other side of said gear box and said pair of arm means respectively projecting to opposite sides of the gear box; a pair of roller means respectively mounted on said pair of arm means intermediate the ends of the latter and rollingly engaging said rail means; a pair of spring means respectively connected at one end thereof to the other end of the respective arm means and at the other end thereof to said gear box, said spring means biased so as to tend to move said other ends of said arm means away from said guide means so as to press said guide portions of said gear box against said guide means; drive means operatively connected to said saw blade for rotating the same about its axis; and reciprocating means operatively connected to said gear box for reciprocating said gear box and the saw blade carried thereby in longitudinal direction of said slot.

8. A sawing apparatus comprising, in combination, support means including an elongated support plate having a plane face against which a workpiece to be sawn is adapted to abut and a face opposite said plane face, said support plate being formed with a longitudinally extending slot therethrough; a pair of guide means fixed to said opposite face and extending in longitudinal direction of said support plate facing away from said plane face thereof and being parallel thereto; a rotary saw blade extending with a portion thereof through said slot; supporting means supporting said saw blade turnably about its axis and movable in longitudinal direction of said slot, and supporting means having guide portions engaging said guide means and said supporting means including biasing means for constantly biasing said guide portions into engagement with said guide means; drive means operatively connected to said saw blade for rotating the same about its axis; and reciprocating means operatively connected to said means for supporting the saw blade for reciprocating said supporting means and the saw blade carried thereby in longitudinal direction of said slot, said reciprocating means including a screw spindle turnably mounted on said support means and extending substantially parallel to said guide means, a nut fixedly mounted on said means for supporting said saw blade and threadingly engaging said screw spindle, and motor means operatively connected to said screw spindle for turning the latter about its axis.

9. A sawing apparatus comprising, in combination, support means including an elongated support plate having a plane face against which a workpiece to be sawn is adapted to abut and a face opposite said plane face, said support plate being formed with a longitudinally extending slot therethrough; a pair of guide means fixed to said opposite face and extending in longitudinal direction of said support plate facing away from said plane face thereof and being parallel thereto; a rotary saw blade extending with a portion thereof through said slot; supporting means supporting said saw blade turnably about its axis and movable in longitudinal direction of said slot, said supporting means having guide portions engaging said guide means and said supporting means including biasing means for constantly biasing said guide portions into engagement with said guide means; drive means operatively connected to said saw blade for rotating the same about its axis; and reciprocating means operatively connected to said means for supporting the saw blade for reciprocating said supporting means and the saw blade carried thereby in longitudinal direction of said slot, said reciprocating means including a cylinder mounted on said support means extending substantially parallel to said guide means, and piston means slidably guided in said cylinder and operatively connected to said means for supporting said saw blade.

10. A sawing apparatus comprising, in combination, a frame; an elongated substantially horizontal support plate having a plane horizontal face against which a workpiece to be sawn is adapted to abut and a face opposite said plane face, said support plate being formed with a longitudinally extending slot therethrough; a pair of guide means fixed to said opposite face and extending in longitudinal direction of said support plate facing away from said plane face thereof and being parallel thereto; a rotary saw blade extending with a portion thereof through said slot; supporting means supporting said saw blade turnably about its axis and movable in longitudinal direction of said slot, said supporting means having guide portions engaging said guide means and said supporting means including biasing means for constantly biasing said guide portions into engagement with said guide means; drive means operatively connected to said saw blade for rotating the same about its axis; and reciprocating means operatively connected to said means for supporting the saw blade for reciprocating said supporting means and the saw blade carried thereby in longitudinal direction of said slot.

11. A sawing apparatus comprising, in combination, a frame; an elongated substantially horizontal support plate having a plane horizontal face against which a workpiece to be sawn is adapted to abut and a face opposite said plane face, said support plate being formed with a longitudinally extending slot therethrough; a pair of guide means fixed to said opposite face and extending in longitudinal direction of said support plate facing away from said plane face thereof and being parallel thereto; a rotary saw blade extending with a portion thereof through said slot; supporting means supporting said saw blade turnably about its axis and movable in longitudinal direction of said slot, said supporting means having guide portions engaging said guide means and said supporting means including biasing means for constantly biasing said guide portions into engagement with said guide means; drive means operatively connected to said saw blade for rotating the same about its axis; and reciprocating means operatively connected to said means for supporting the saw blade for reciprocating said supporting means and the saw blade carried thereby in longitudinal direction of said slot, said reciprocating means including a screw spindle turnably mounted on said support means and extending substantially parallel to said guide means, a nut fixedly mounted on said means for supporting said saw blade and threadingly engaging said screw spindle, and motor means operatively connected to said screw spindle for turning the latter about its axis.

12. A sawing apparatus comprising, in combination, a substantially U-shaped frame having an upright portion and upper and lower substantially horizontal portions projecting from opposite ends of said upright portion; an elongated support plate extending between said horizontal portions of said frame substantially parallel to said upright portion and having a plane face facing away from said upright portion said support plate being formed with a longitudinally extending slot therethrough; a support table on said lower portion of said frame for supporting a workpiece thereon; means on said support table for clamping a workpiece thereon against said plane face of said elongated plate against which a workpiece to be sawn is adapted to abut and a face opposite said plane face, a pair of guide means fixed to said opposite face and extending in longitudinal direction of said support plate facing away from said plane face thereof and being parallel thereto; a rotary saw blade extending with a portion thereof through said slot; supporting means supporting said saw blade turnably about its axis and movable in longitudinal direction of said slot, said supporting means having guide portions engaging said guide means and said supporting means including biasing means for constantly biasing said guide portions into engagement with said guide means; drive means operatively connected to said saw blade for rotating the same about its axis; and reciprocating means operatively connected to said means for supporting the saw blade for reciprocating said supporting means and the saw blade carried thereby in longitudinal direction of said slot.

13. A sawing apparatus comprising, in combination, a substantially U-shaped frame having an upright portion and upper and lower substantially horizontal portions projecting from opposite ends of said upright portion; an elongated support plate extending between said horizontal portions of said frame substantially parallel to said upright portion and having a plane face facing away from said upright portion said support plate being formed with a longitudinally extending slot therethrough; a support table on said lower portion of said frame for supporting a workpiece thereon; means on said support table for clamping a workpiece thereon against said plane face of said elongated plate against which a workpiece to be sawn is adapted to abut and a face opposite said plane face; a pair of guide means fixed to said opposite face and extending in longitudinal direction of said support plate facing away from said plane face thereof and being parallel thereto; a rotary saw blade extending with a portion thereof through said slot; supporting means supporting said saw blade turnably about its axis and movable in longitudinal direction of said slot, said supporting means having guide portions engaging said guide means and said supporting means including biasing means for constantly biasing said guide portions into engagement with said guide means; drive means operatively connected to said saw blade for rotating the same about its axis; and reciprocating means operatively connected to said means for supporting the saw blade for reciprocating said supporting means and the saw blade carried thereby in longitudinal direction of said slot, said reciprocating means including a cylinder mounted on said support means extending substantially parallel to said guide means, and piston means slidably guided in said cylinder and operatively connected to said means for supporting said saw blade.

14. A sawing apparatus comprising, in combination, a frame; an elongated substantially horizontal support plate mounted on said frame and having a plane upper horizontal face against which a workpiece to be sawn is adapted to abut and a face opposite said plane face, said support plate being formed with a longitudinally extending slot therethrough; a pair of guide means fixed to said opposite face and extending in the longitudinal direction of said support plate facing away from said plane face thereof and being parallel thereto; a circular saw blade extending with an upper portion thereof through said slot; rail means fixedly mounted on said frame and extending spaced from and substantially parallel to said pair of guide means; a gear box supporting said saw blade turnable about its axis and having a pair of upper guide portions respectively slidably engaging said pair of guide means; a pair of arm means each pivotally connected at one end thereof to said gear box tiltably about a pivot axis located in a plane substantially parallel to said guide means and extending in said plane substantially normal to said guide means, the pivot axis of one of said pair of arm means being located at one side of said gear box and the other of said pair of arm means being located at the other side of said gear box and said pair of arm means respectively projecting to opposite sides of said gear box; a pair of roller means respectively mounted on said pair of arm means intermediate the ends of the latter and rollingly engaging said rail means; a pair of coiled tension spring means respectively connected at one end thereof to the other end of the respective arm means and at the other end thereof to said gear box, said spring means biased so as to tend to move the other ends of said arm means away from said guide means so as to pivot said arms about said roller means in a direction so as to press said guide portions of said gear box against said guide means; a drive motor mounted on said gear box and operatively connected to said saw blade for turning the latter about its axis; and reciprocating means for reciprocating said gear box and said saw blade supported thereon in longitudinal direction of said slot, said reciprocating means including an elongated screw spindle turnably mounted in said frame and extending substantially parallel to said guide means, a nut fixedly mounted in said gear box and threadingly engaging said screw spindle, and motor means operatively connected to said screw spindle for turning the latter about its axis.

15. A sawing apparatus comprising, in combination, a substantially U-shaped frame having an upright portion and upper and lower substantially horizontal portions projecting from opposite ends of said upright portion; an elongated support plate extending between said horizontal portions of said frame substantially parallel to said upright portion spaced from the latter and having a plane face facing away from said upright portion and an opposite face, said support plate being formed with a slot extending therethrough and in longitudinal direction between said horizontal portions of said frame; a pair of guide means fixed to said opposite face of said plate and extending in longitudinal direction of said plate facing away from said plane face thereof and being parallel thereto; a support table on said lower portion of said frame for supporting a workpiece to be sawn thereon; means on said support table for clamping a workpiece thereon against said plane face of said elongated plate; a circular saw blade extending with a portion thereof through said slot beyond said plane face of said elongated plate; a gear box supporting said saw blade turnable about its axis, said gear box having a pair of guide portions respectively slidably engaging said guide means; a carriage having roller means slidably guided on said upright portion of said frame; compression spring means engaging with opposite ends said carriage and said gear box for resiliently pressing the guide portions of the latter against said guide means; and reciprocating means operatively connected to said gear box for reciprocating the latter in longitudinal direction of said slot, said reciprocating means including a cylinder mounted on said frame extending substantially parallel to said upright portion thereof and piston means slidably guided in said cylinder and operatively connected to said gear box.

References Cited by the Examiner

UNITED STATES PATENTS

| 2,610,389 | 9/1952 | Bungay | 143—47 |
| 2,933,113 | 4/1960 | Meyer | 143—47 |
| 2,956,597 | 10/1960 | Leitchner | 143—47 |

WILLIAM W. DYER, JR., *Primary Examiner.*

JAMES M. MEISTER, *Examiner.*